United States Patent

Roberts et al.

[11] Patent Number: 5,936,156
[45] Date of Patent: *Aug. 10, 1999

[54] LIQUID METERING

[75] Inventors: Graham Richard Roberts, Hatton; Andrew Jonathan Cole, Thornton; Barry Leonard Price, Quorn, all of United Kingdom

[73] Assignee: British Gas plc, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 08/832,562

[22] Filed: Apr. 2, 1997

[30] Foreign Application Priority Data

Apr. 4, 1996 [GB] United Kingdom .................. 9607257

[51] Int. Cl.⁶ ...................................... G01F 1/68
[52] U.S. Cl. ................. 73/204.19; 73/202.5; 73/204.17; 73/204.23; 73/204.27
[58] Field of Search .............................. 73/202.5, 204.15, 73/204.17, 204.18, 204.19, 204.23, 204.27

[56] References Cited

U.S. PATENT DOCUMENTS 4,475,388  10/1984  Kawai et al. .
4,817,427   4/1989  Kitano et al. .
5,285,673   2/1994  Drexel et al. .

FOREIGN PATENT DOCUMENTS 134 859 A1  3/1985  European Pat. Off. .
WO 89/12216 12/1989  WIPO .

OTHER PUBLICATIONS

"A Calibration System for Calorimetric Mass Flow Devices", Widmer et al, *J. Phys. E. Sci. Instrum.*, vol. 15, 1982, Great Britain.
Patent Abstracts of Japan, Pub. No. 57120816, Jul. 28, 1982, Tatsuo et al, "Heat Ray Pulse Flowmeter".
Patent Abstracts of Japan, Pub. No. 63015120, Jan. 22, 1988, Shinji et al, "Flow Rate Measuring Apparatus".

*Primary Examiner*—Richard Chilcot
*Assistant Examiner*—Eric S. McCall
*Attorney, Agent, or Firm*—Larson & Taylor

[57] ABSTRACT

A meter to measure the volumetric flow rate of a liquid, for example water, is formed with a pipe forming a liquid flow path containing a low power electrical heater. A first temperature sensor measures the temperature T of the liquid adjacent to an upstream end of the heater and a second temperature sensor measures the temperature $T_2$ of the liquid adjacent to a downstream end of the heater. The heater adds heat power of a value P to the liquid. A control arrangement comprising a computer means calculates the flow rate Q using the expression $$Q = \frac{P}{ST_1 \times DT_1(T_2 - T_1)},$$

where $ST_1$ and $DT_1$ are respectively the specific heat capacity of the liquid and the density of the liquid at the temperature $T_1$ measured by the first sensor.

15 Claims, 2 Drawing Sheets

■ Density $DT_1$, ◇ Sp. Ht. Capacity $ST_1$

LIQUID METERING

BACKGROUND TO THE INVENTION

This invention concerns liquid metering, and in particular the invention concerns a method of measuring the volumetric flow rate of liquid flowing along a path, and also concerns a liquid meter to measure the volumetric flow rate of liquid flowing along a path.

The liquid may be water.

Conventional water meters use a variety of technologies. They may use turbines or other rotating elements that are responsive to the volume of water flowing and possessing a known characteristic relating flow rate to the turbine rotational speed. Or they may use ultrasonic velocity measurement, where the "time of flight" between the transmission and reception of an ultrasound pulse is related to the velocity of the flowing water. Or they may use electromagnetic velocity measurement, where the average velocity of passing magnetic particles or ions suspended in the water is related to a bulk flow measurement.

Existing low cost flow meters, particularly those fitted to measure domestic water consumption, suffer from a number of deficiencies, including poor reliability and poor accuracy.

The reliability problem is mainly due to the susceptibility of existing technologies to contaminants being deposited from the water supply over a long period. Turbine meters are particularly susceptible to scaling, affecting bearing/spindle friction, this problem being more likely to affect the calibration for low flow rates.

However the electromagnetic meters can also be affected by the use of very clean, de-ionised water, where the measurement principle does not operate at all.

Poor accuracies can be caused partly by contaminants, partly by poor installation and partly by the particular technology used. scaling will affect the calibration of turbine, ultrasonic and electromagnetic meters, due to the change in the dimensions of flow channels, which in turn affects the velocities of the fluids for a given volumetric flow rate.

The characteristics of the turbine impeller will also be altered by scale build up. Installation errors can affect the accuracy of all water meters that measure velocity. Particular care needs to be exercised to ensure that sufficient lengths of straight pipe are installed both upstream and downstream of the meter.

Limited operational range of flow measurement provided by many conventional water meters can cause large errors, particularly where meters are oversized for the particular installation or where the actual flow rates vary over a wide range.

For acceptance and reliability, high costs must be paid. It has been estimated that for a utility water meter with +or −1% it accuracy, similar to that provided by a gas or electricity meter, the price is between five and ten times as much. Even with such an investment, long term reliability is unlikely to be as good as that provided by either gas or electricity meters. Experience of poor meter reliability is indicated by the requirement in Germany that all water meters must by removed from service every five years for re-calibration and servicing if they are being used for billing purposes.

One object of the invention is to provide a method of measuring volumetric flow rate of a liquid, which if the liquid should be water, avoids the above mentioned disadvantages. Another object is to provide a liquid meter which if used to measure the volumetric flow rate of water avoids the above mentioned disadvantages.

SUMMARY OF THE INVENTION

According to a first aspect of the invention there is provided a method of measuring the volumetric flow rate of liquid flowing along a path comprising adding heat of a heat power value P to the liquid at a location in said path, measuring a temperature difference value $(T_2 - T_1)$ between a temperature $T_1$ of the liquid in said path at a first position adjacent to an upstream extremity of said location and a temperature $T_2$ of the liquid in said path at a second position adjacent to a downstream extremity of said location, upstream and downstream being with respect to the direction of the flow of the liquid passed said location, and calculating the volumetric flow rate Q of the liquid according to the expression:-

$$Q = \frac{P}{ST_1 \times DT_1 \times (T_2 - T_1)},$$

where $ST_1$ is the specific heat capacity of the liquid at said first position and $DT_1$ is the density of the liquid at the temperature of said liquid at said first position.

According to a second aspect of the invention there is provided liquid meter to measure the volumetric flow rate of a liquid comprising a path for flow of the liquid therealong, heat adding means to add heat of a heat power value P to said liquid at a location in said path when the meter is in use, temperature difference measuring means to measure a temperature difference value $(T_2 - T_1)$, when the meter is in use, between a temperature $T_1$ of the liquid in said path at a first position adjacent to an upstream extremity of said location and a temperature $T_2$ of the liquid in said path at a second position adjacent to a downstream extremity of said location, upstream and downstream being with respect to the direction of liquid flow passed said location when the meter is in use, and means to calculate the volumetric flow rate Q of the liquid according to the expression:-

$$Q = \frac{P}{ST_1 \times DT_1 \times (T_2 - T_1)},$$

where $ST_1$ is the specific heat capacity of the liquid at said first position and $DT_1$ is the density of the liquid at the temperature of the liquid at said first position.

BRIEF DESCRIPTION OF THE DRAWINGS

Each aspect of the invention will now be further described with reference to the accompanying drawings in which.

DESCRIPTION OF PREFERRED EMBODIMENTS

Figure 1:
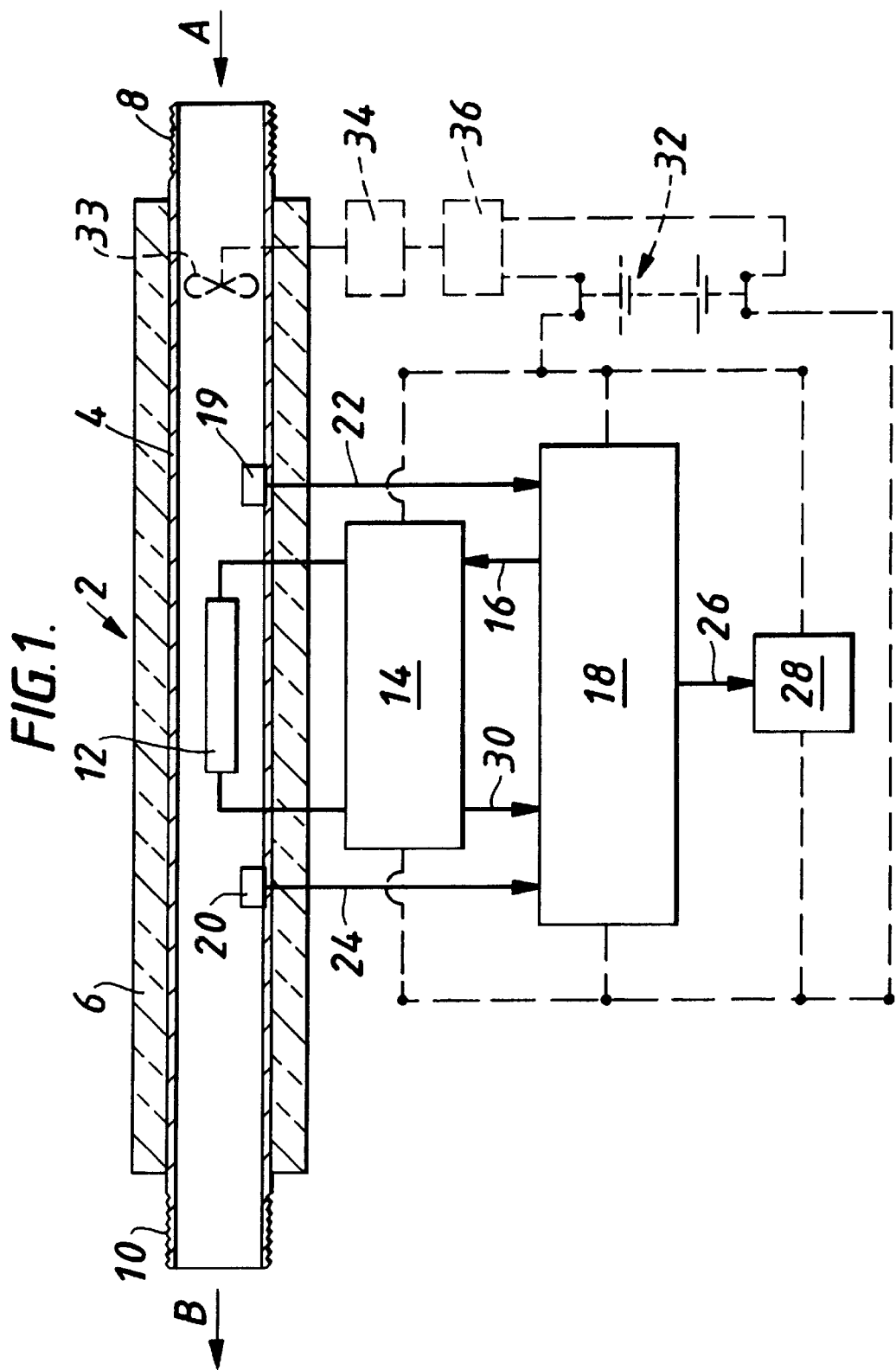
FIG. 1 shows diagrammatically, and partly in section, an embodiment of a liquid meter to measure the volumetric flow rate of a liquid according to the second aspect of the invention and capable of performing the method according to the first aspect.

With reference to the accompanying drawings a volumetric liquid flow rate meter 2 comprises a path or pipe 4 which can be surrounded by good heat insulation 6 and may be adapted at each end, for example by screw threads 8 and 10, for connection through suitable couplings into a supply line through which the liquid is supplied.

The liquid may be water and the aforesaid supply line may be a water main; thus the meter 2 would be a water meter. The water main may lead to premises for example domestic premises, in which case the meter 2 is a domestic water meter.

The liquid being measured enters the pipe 4 in the direction of arrow A and leaves in the direction of arrow B.

Within the pipe 4 is an electric heater 12 preferably a low power heater which may, for example, have a rating of the order of five watts. The heater 12 is provided with electrical power from a suitable power supply 14 operated in response to signals on signal path 16 from a control arrangement 18 which can be electrical or electronic apparatus comprising computer means serving as calculating means. A temperature sensor 19 is mounted in the pipe 4 upstream of the heater 12 and another temperature sensor 20 is mounted in the pipe downstream of the heater. Thus the heater 12 is mounted in the pipe 4 at a location between the two temperature sensors 19, 20 which are disposed adjacent to opposite ends of the location at which the heater adds heat to the liquid.

The temperature sensors 19, 20 are electrical or electronic devices providing signals, on signal paths 22, 24 respectively, representative of the temperatures of the fluid they observe within the pipe 4. The temperature sensors 19, 20 are preferably accurate and also preferably have a high resolution, for example an ability to measure in accurate small increments of, for example, 0.001° C.

The temperature of the liquid observed by the sensor 19 is $T_1$ degrees Celsius (C) and that observed by the sensor 20 is $T_2$° C. The heat input to the liquid by the heater 12 is P watts. At the sensor 19 the density of the liquid is $DT_1$ in kg/m$^3$ and the specific heat capacity is $ST_1$ in J/kg/° C. The control arrangement 18 calculates the volumetric flow rate Q of the liquid in cubic metres (m$^3$) per second according to the expression $$Q = \frac{P}{ST_1 \times DT_1 \times (T_2 - T_1)} - (1)$$

Figure 2:
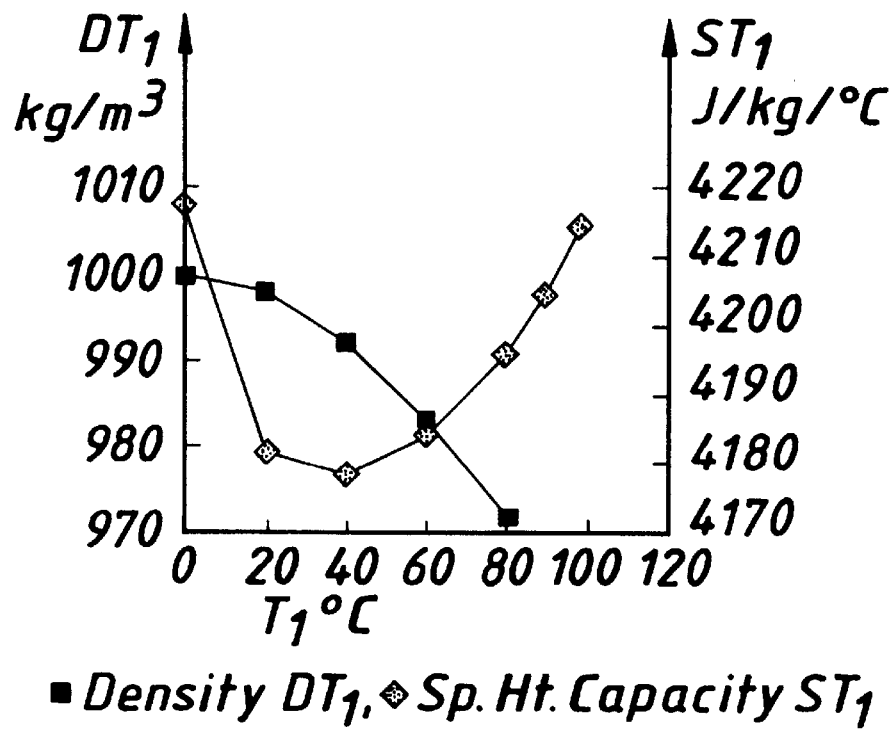
FIG. 2 is a graph showing variation of the density $DT_1$ (in kg per m$^3$) of water with water temperature in degrees Celsius ° C), and showing variation of specific heat $ST_1$ (in Joules J per kg per ° C) of water with water temperature in ° C.
Figure 3:
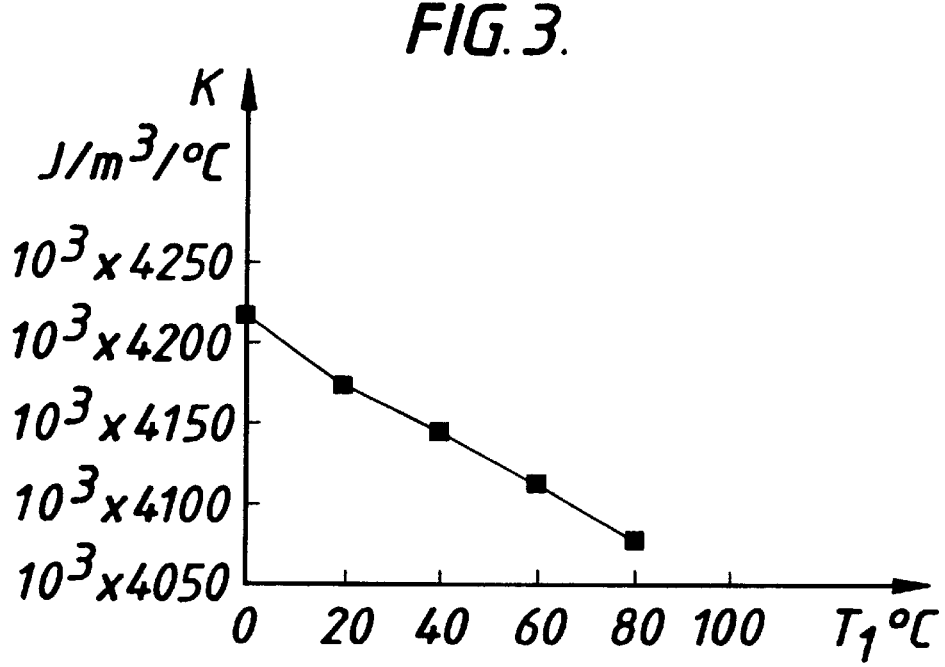
FIG. 3 is a graph showing variation of a factor K (in J per m$^3$ per ° C) for water with water temperature in ° C where $K = ST_1 \times DT_1$

The control arrangement 18 is programmed with an expression by which the variable value of $ST_1 \times DT_1$ with variation in the measured temperature $T_1$ can be calculated, or the control arrangement may be provided with look-up table providing respective values for $ST_1 \times DT_1$ for different observed values of $T_1$. How such information may be obtained for provision to the control arrangement 18 may be understood from FIGS. 2 and 3 which relate to water as the liquid being measured. In FIG. 2 variation of water density $DT_1$ with temperature $T_1$ is shown as is variation of specific heat capacity $ST_1$ with temperature $T_1$. $K = ST_1 \times DT_1$ so that from FIG. 2, the value of K for respective values of $T_1$ can be calculated and are represented by the graph in FIG. 3. For example, when the water temperature $T_1$ is 10° C K has a value of about 4200 ×10$^3$ J/m$^3$°C.

The control arrangement 18 may send signals on path 26 to a recorder and/or display means 28 which gives a record or indication of the liquid flow rate at that instant, and the control arrangement may integrate the successive calculated values 0 of volumetric flow rate with respect to time and send signals on path 26 for the record or display of the amount of liquid supplied over a period of time. Also the control arrangement 18 may have cost data input thereto so that it may calculate the money cost of the liquid supplied over a period and/or the money rate at which the liquid is being supplied, and this cost and/or money rate may be recorded and or displayed by the recorder and/or display means 28. The power output P supplied by heater 12 may be assumed to be substantially constant or the control arrangement 18 may calculate the value of P from the expression P =i x v, where v is the voltage across the heater and i is the current flowing through the heater; signals representing, for example, instantaneous values of v and i being supplied on path 30 to the control arrangement from the power supply 14.

As an optional feature, the electrical components of the meter may be powered by a rechargeable battery 32, liquid flow powered turbine 33 being provided in the pipe 4 to drive an electrical generator 34 supplying electrical power to a battery charger 36 charging the battery.

To ensure that measuring accuracy is maintained over long periods and that low heating power can be used, the electrical supply to heater 12 can by repeatedly and regularly shut off by the control arrangement 18 for a period and then restored for a period. For example the heater on period and the heater off period may be substantially equal and may, for example, each be of substantially five seconds duration. Switching the heater 12 on and off allows the temperature sensors 19, 20 to be calibrated. When the heater 12 is switched off the temperature readings of the sensors 19 and 20 should be the same, namely $T_1$, and thus the expression $T_2-T_1$ should be zero. But there may be a difference or error e between the value $T_1$ and the value $T_2$ because the sensors 19 and 20 are not giving identical outputs, so that $T_2 T_1 \pm e$. The control arrangement 18 subtracts $T_1$ from $T_2$ to give the error e which is +e if the value of $T_2$ is less than $T_2$ (the sensor 20 is reading low compared to sensor 19) and –e if the value of T is greater than T (the sensor 20 is reading high compared to sensor 19).

Next time the heater 12 is switched on and the temperature readings of the sensors 19 and 20 are $T_1$ and $T_2$ respectively, then the control arrangement 18 calculates the temperature across the heater between the two sensors as $T_2-T_1+e$ when sensor 20 is reading low and as $T_2-T_1-e$ when sensor 20 is reading high.

The output signal from each sensor 19 and 20 may be recorded by the control arrangement 18 and the temperature difference between the sensors, when the heater 12 is on, is calculated when, over a pre-determined period of time, successively recorded temperature differences, during a heater-on period, all lie within a pre-determined tolerance; those successively recorded temperature differences are averaged and the average value used as the difference $(T_2-T_1)$ in the expression (1) above.

To allow a wide turndown in liquid flow rates to be accommodated without causing excessively high electrical signals to be produced resultant from high temperature measurements by the sensor 20, the heater power P may be controlled by control arrangement 18 to avoid high signals being produced. Both the heater power magnitude P and the on/off duration can be altered for each on/off cycle of heater operation following the attainment of a stable liquid temperature difference across the heater 12 between the sensors 19 and 20. The magnitude of the heater power P is varied from a relatively high predetermined value, (but still only a few watts) at a relatively high predetermined flow rate down to a relatively low predetermined value at a relatively low predetermined flow rate to ensure that the temperature difference $(T_2 - T_1)$ is substantially the same at both extremes of flow. The heater-on duration may be reduced at low flow rates because the temperature $T_2$ observed by the downstream sensor 20 attain a higher value in a shorter time than when the flow rates are high.

The volumetric flow meter 2 as described above has a number of advantages. They are:-

A. A wide turndown in flow can be accurately measured. In contrast with conventional meter technology, the accuracy for the meter 2 increases at low flows. The reason for this increasing accuracy is that as the flow is reduced, the temperature difference $(T_2-T_1)$ will rise, for a given constant value of heater power P.

B. Fluid contaminant deposits on the inside of the meter 2 over a long period of time will not affect the accuracy of measurement. This is because when the internal surfaces are contaminated, the injected heat will still get to the fluid and hence to the downstream sensor 20, although the time taken for the heat transfer may be increased. In addition, the relationship $$Q = \frac{P}{ST_1 \times DT_1 \times (T_2 - T_1)},$$

is independent of flow velocity and the cross-sectional area of pipe 4, hence scaling will have no effect upon the determining of Q.

C. The meter 2 is capable of correcting for variations in the specific heat capacity and density of the water as temperature varies.

D. The final cost of manufacture of the meter 2 can be competitive with existing technologies, as simple electronics, sensors and mechanical components can be used, with no moving parts (neglecting the turbine 33 and generator 34, the use of which are not essential).

E. Reliability can be high as no moving parts need be used.

F. For the required accuracy of +or −1% no extra calibration will be necessary. The pre-determined sensor calibration, the heater power measurements, and the pre-programmed values of coefficient $(ST_1xDT_1)$ are already provided resulting in considerable cost savings.

We claim:-:

1. A method of measuring a volumetric flow rate of liquid flowing along a path comprising adding heat of a heat power value P to liquid at a location in said path, measuring a temperature difference value $(T_2-T_1)$ between a temperature $T_1$, of the liquid in said path at a first position adjacent to an upstream extremity of said location and a temperature $T_2$ of the liquid in said path at a second position adjacent to a downstream extremity of said location, upstream and downstream being with respect to the direction of the flow of the liquid passed said location, and calculating the volumetric flow rate Q of the liquid according to the expression:

$$Q = \frac{P}{ST_1 \times DT_1 \times (T_2 - T_1)}$$

where $ST_1$, is the specific heat capacity of the liquid at said first position and DT, is the density of the liquid at the temperature of said liquid at said first position, wherein the temperature $T_1$ is measured using first temperature sensing means upstream of said location and the temperature $T_2$ is measured using second temperature sensing means downstream of said location, the addition of heat is intermittent, and during an interruption in the adding of heat any difference in the temperature measurements of the first and second temperature sensing means being compensated for by calibration.

2. A method according to claim 1, wherein Q is calculated while heat is being added at said location and the term $(T_2-T_1)$ used in the expression is an average of a plurality of successive measurements of the temperature difference (whilst heat is being added at said location) between the first and second positions found to be within a pre-determined tolerance.

3. A method according to claim 1, wherein heat is added for time periods which are shorter when the liquid flow rate is low in comparison with the length of time periods during which heat is added when the liquid flow rate is higher.

4. A method accordig to claim 1, wherein the liquid flow rate Q is integrated with respect to time to give a volume of liquid which has passed along the path in a time period.

5. A method according to claim 4, wherein flow rate Q data and money cost data are used to calculate a money value of the liquid which has passed along the path in said time period.

6. A method according to claim 1, wherein the liquid is water.

7. A liquid meter for measuring a volumetric flow rate of a liquid comprising a path for flow of the liquid therealong, heat adding means for adding heat of a heat power value P to said liquid at a location in said path when the meter is in use, temperature difference measuring means for measuring a temperature difference value $(T_2-T_1)$, when the meter is in use, between a temperature $T_1$, of the liquid in said path at a first position adjacent to an upstream extremity of said location and a temperature $T_2$ of the liquid in said path at a second position adjacent to a downstream extremity of said location, upstream and downstream being with respect to the direction of liquid flow passed said location when the meter is in use, and calculating means for calculating the volumetric flow rate Q of the liquid according to the expression:

$$Q = \frac{P}{ST_1 \times DT_1 \times (T_2 - T_1)}$$

where $ST_1$ is the specific heat capacity of the liquid at said first position and $DT_1$ is the density of the liquid at the temperature of the liquid at said first position, wherein control mens comprises said calculated means, the temperature difference measuring means comprises first temperature sensing means at said first position and second temperature sensing means at said first position.

8. A liquid meter according to claim 7, wherein the heat adding means comprises an electrical heater in said path.

9. A liquid meter according to claim 8, wherein Q is calculated while heat is being added at said location and the control means is arranged for deriving the term $(T_2-T_1)$ used in said expression by deriving an average of a plurality of successive measurements of the temperature difference (whilst the heat adding means is adding heat) between the first and second positions found by said control means to be within a pre-determined tolerance.

10. A liquid meter according to claim 7, wherein the control means arranged for controlling operation of the heat adding means such that heat is added for time periods which are shorter when the liquid flow rate is low compared with the length of time periods during which heat is added when the liquid flow rate is higher.

11. A liquid meter according to claim 7, wherein the control means is arranged for integrating the liquid flow rate Q with respect to time for giving a volume of liquid which has passed along the path in a time period.

12. A liquid meter according to claim 11, wherein the control means is arranged for using flow rate Q data and money cost data for calculating a money value of the liquid which has passed along the path in said time period.

13. A liquid meter according to claim 7, wherein the path has external heat insulation.

14. A liquid meter according to claim 7, wherein the meter has a rechargeable battery for providing electrical power, and the battery is rechargeable by battery charging means supplied with electrical power by electrical power generating means arranged for driving in response to liquid flow along the path.

15. A liquid meter according to claim 7, wherein the liquid is water.

* * * * *